US008805848B2

(12) United States Patent
Bhatia et al.

(10) Patent No.: US 8,805,848 B2
(45) Date of Patent: *Aug. 12, 2014

(54) SYSTEMS, METHODS AND COMPUTER PROGRAM PRODUCTS FOR FAST AND SCALABLE PROXIMAL SEARCH FOR SEARCH QUERIES

(75) Inventors: Sumit Bhatia, State College, PA (US); Bin He, San Jose, CA (US); Qi He, San Jose, CA (US); William S. Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/480,429

(22) Filed: May 24, 2012

(65) Prior Publication Data

US 2013/0318090 A1 Nov. 28, 2013

(51) Int. Cl.
*G06F 17/30* (2006.01)

(52) U.S. Cl.
USPC .......................................... 707/741; 707/728

(58) Field of Classification Search
USPC ......... 707/706, 710, 724, 728, 737, 740, 741, 707/751
See application file for complete search history.

(56) References Cited

U.S. PATENT DOCUMENTS

| | | | |
|---|---|---|---|
| 6,711,585 B1 | 3/2004 | Copperman et al. | |
| 7,305,389 B2 | 12/2007 | Zeng et al. | |
| 8,266,148 B2 | 9/2012 | Guha et al. | |
| 8,370,345 B2 * | 2/2013 | Spangler | 707/728 |
| 8,374,935 B1 * | 2/2013 | Lucash | 705/35 |
| 8,452,766 B1 * | 5/2013 | Gomes et al. | 707/728 |
| 8,515,935 B1 * | 8/2013 | Baluja et al. | 707/706 |
| 2004/0044659 A1 | 3/2004 | Judd et al. | |
| 2006/0036593 A1 * | 2/2006 | Dean et al. | 707/4 |
| 2007/0136251 A1 * | 6/2007 | Colledge et al. | 707/3 |
| 2007/0198506 A1 * | 8/2007 | Attaran Rezaei et al. | 707/5 |
| 2008/0086507 A1 * | 4/2008 | Szygenda et al. | 707/104.1 |
| 2009/0138466 A1 * | 5/2009 | Henry et al. | 707/5 |
| 2009/0198667 A1 * | 8/2009 | Groeneveld et al. | 707/5 |
| 2009/0228777 A1 * | 9/2009 | Henry et al. | 715/230 |
| 2010/0153440 A1 * | 6/2010 | Hubert | 707/769 |
| 2010/0161584 A1 * | 6/2010 | Lindblad et al. | 707/706 |
| 2010/0250547 A1 * | 9/2010 | Grefenstette et al. | 707/740 |
| 2010/0332503 A1 | 12/2010 | Buckley et al. | |
| 2011/0004618 A1 | 1/2011 | Chaudhary | |
| 2011/0040766 A1 | 2/2011 | Robinson et al. | |

(Continued)

OTHER PUBLICATIONS

Anonymous, "A system and method to create customizable results snippets in a free-text search software application", pp. 1-4, Sep. 15, 2011, IP.com, United States.

(Continued)

*Primary Examiner* — Jean M Corrielus
(74) *Attorney, Agent, or Firm* — Kenneth L. Sherman, Esq.; Michael Zarrabian, Esq.; Sherman & Zarrabian LLP (57) ABSTRACT

Embodiments of the invention provide a system, method and computer program products for information retrieval from multiple documents by proximity searching for search queries. A method includes generating an index for the multiple documents, wherein the index includes words in snippets in the documents. An input search query is processed against the index by searching query terms over the snippets to introduce term proximity information implicitly in the information retrieval. Results of multiple sentence level search operations are combined as output.

10 Claims, 5 Drawing Sheets

(56) References Cited

U.S. PATENT DOCUMENTS

| | | | |
|---|---|---|---|
| 2011/0047161 A1* | 2/2011 | Myaeng et al. | 707/740 |
| 2011/0066611 A1* | 3/2011 | Groeneveld et al. | 707/723 |
| 2011/0078159 A1 | 3/2011 | Li et al. | |
| 2011/0179012 A1 | 7/2011 | Pedersen | |
| 2011/0252030 A1* | 10/2011 | Spangler | 707/729 |
| 2011/0302162 A1* | 12/2011 | Xiao et al. | 707/724 |
| 2011/0313992 A1* | 12/2011 | Groeneveld et al. | 707/706 |
| 2012/0131021 A1* | 5/2012 | Blair-Goldensohn et al. | 707/750 |

OTHER PUBLICATIONS

Anonymous, "A Cluster Search by Using Search Service Snippets", pp. 1-4, Feb. 19, 2007, IP.com, United States.

Tao, T., et al., "An exploration of proximity measures in information retrieval", Proceedings of the 30th annual international ACM SIGIR conference on Research and development in information retrieval, pp. 295-302, Jul. 23-27, 2007, ACM, New York, United States.

Spangler, S., et al., "SIMPLE: Interactive Analytics on Patent Data", 2010 IEEE International Conference on Data Mining Workshops, pp. 426-433, Dec. 2010, IEEE, Sydney, Australia.

Huston, S., et al., "Evaluating verbose query processing techniques", Proceedings of the 33rd international ACM SIGIR conference on Research and development in information retrieval, pp. 291-298, 2010, ACM, New York, United States.

Bendersky, M., et al., "Discovering key concepts in verbose queries", Proceedings of the 31st annual international ACM SIGIR conference on Research and development in information retrieval, pp. 491-498, 2008, ACM, New York, United States.

Liu, X., et al., "Passage retrieval based on language models", In Proceedings of CIKM 2002, pp. 375-382, Nov. 2002, ACM, Virginia, United States.

U.S. Non-Final Office Action for U.S. Appl. No. 13/587,413 mailed Apr. 10, 2013.

U.S. Final Office Action for Application U.S. Appl. No. 13/587,413 mailed Sep. 19, 2013.

U.S. Notice of Allowance for U.S. Appl. No. 13/587,413 mailed Jan. 15, 2014.

* cited by examiner

SYSTEMS, METHODS AND COMPUTER PROGRAM PRODUCTS FOR FAST AND SCALABLE PROXIMAL SEARCH FOR SEARCH QUERIES

FIELD OF THE INVENTION

The present invention generally relates to information search and retrieval, and more particularly, to a system, method and computer program products for proximity searching for search queries in an information retrieval system.

BACKGROUND

In many practical searching applications, the input queries to an information retrieval system are much longer (roughly a paragraph of text) as compared to the average 2-3 keywords most of search engines are optimized for. For example, a majority of queries received by search engines such as commercial web search engines (WSEs) are very short (e.g., 2-3 keywords on an average). Most WSEs do not provide support for very long, verbose queries. Long queries (e.g., up to a sentence long) require adopting search techniques which negatively impact the response time of search engines. Further, due to the large number of terms in such long queries, mechanisms are required to take into account the relative distance between query terms in documents being searched.

BRIEF SUMMARY

Embodiments of the present invention provide a system, method and computer program product for information retrieval from multiple documents by proximity searching for search queries. A method includes generating an index for the multiple documents, wherein the index includes words in snippets in the documents. An input search query is processed against the index by searching query terms over the snippets to introduce term proximity information implicitly in the information retrieval. Results of multiple sentence level search operations are combined as output.

In one embodiment generating an index for the multiple documents comprises splitting each document into multiple snippets of words, and generating an index for each snippet.

In one embodiment the search query includes natural text input of multiple sentences. Processing the search query further comprises processing the search query against the index, sentence by sentence, using all words in each sentence to create an OR-Query of all non-stopwords in the sentence. Processing the search query further comprises returning a fit value for each OR-Query, and aggregating the fit values to provide a score for every document returned by the OR-Queries.

In one embodiment, the method further comprises determining the frequency of each non-stopword in the documents, and removing from the search those words having a frequency that exceeds a threshold.

In one embodiment, the method further comprises decomposing the search query into sub-queries, and processing each sub-query against the index for searching sub-query terms over the snippets to introduce term proximity information implicitly in the information retrieval. One method includes processing each sub-query against the index, sentence by sentence, using all words in each sentence of the sub-query to create an OR-Query of all non-stopwords in the sentence, returning a fit value for each OR-Query, and aggregating the fit values to provide a score for every document returned by the OR-Queries.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. One or more exemplary embodiments of the invention are described below in detail. The disclosed embodiments are intended to be illustrative only since numerous modifications and variations therein will be apparent to those of ordinary skill in the art.

Embodiments of the present invention relate to a document retrieval for search queries. In many applications, input queries to an information retrieval system are very long. Embodiments of the invention allow search operations for input search queries such as long search queries. Embodiments of the invention provide fast and scalable proximal search for very long search queries taking into consideration the proximity of query terms in the documents to be searched and retrieved. An embodiment of the invention enables conducting fast proximity searching for very long queries in an information retrieval system.

Information retrieval systems (e.g., search engines) limit the size of input queries because the time taken for search and retrieval operations increases with the number of words in the input query. A typical search engine retrieves documents based on a search query, processes the documents and stores the information about the documents in the form of an index data structure.

The most widely used data structure in conventional information retrieval systems is an inverted index that includes a number of posting lists. A posting list is a list of document identifiers (IDs) that contain a given term. There is one posting list in the inverted index for each term in the corpus. When an information retrieval system receives an input query, it retrieves the posting lists for all the query terms. Each posting list provides a set of IDs of documents that contain the corresponding query terms. Depending on the semantics of the query, the sets of document IDs provided by different posting lists are then merged together to create the final result set. Thus, for very long queries, the number of posting lists that the information retrieval system has to merge together to create the final list of documents is very large, resulting in very long query response times.

In addition to very long response times, the results produced by conventional search engines are often not satisfactory and contain a very large number of false positives (i.e., very low precision). The major reason for such low precision is again the length of input queries. Specifically, any document that contains at least one of the query words is a potential match for the query and since the input query is very long and contains a large number of keywords, the number of matching potential documents is very large.

Embodiments of the invention provide processing long queries employing proximity searching. Each document to be searched for query terms is split into smaller units so as to incorporate an implicit proximity search operation. Snippets are extracted from documents and then an index of the snippets is created. In one embodiment, said implicit proximity search operation is used which splits a given document into smaller units (e.g., snippets) followed by combining results of multiple sentence level search operations. A document is split into smaller indexable units, wherein the search result (i.e., retrieved unit) is still the complete original document as compared to a small passage of the document. Embodiments of the invention do not require use of proximal operators because performing a simple search on a snippet-based index implicitly takes into account the distance between query terms in the documents, according to the invention.

Figure 1:
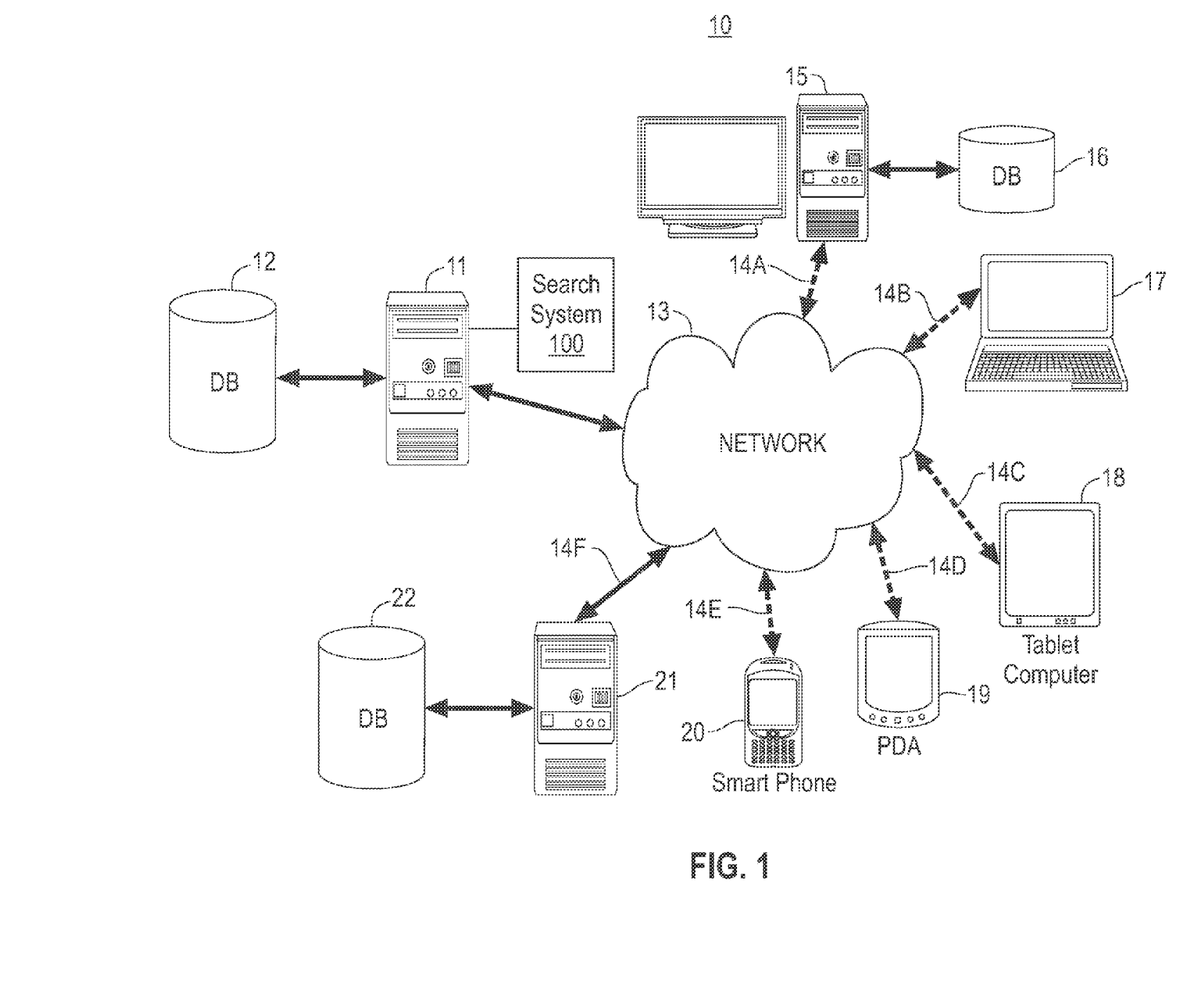
FIG. 1 is a block diagram illustrating an example of a network environment for proximity searching for queries, according to an embodiment of the present invention.

Referring now to the drawings, FIG. 1 illustrates an example of the basic components of an information technology system 10 utilizing a search system 100 that implements a search process comprising fast and scalable proximal searching for very long search queries, according to a preferred embodiment of the present invention. The information technology system 10 includes a server 11 and remote devices 15 and 17-20 that may utilize the search system 100 of the present invention.

In one embodiment, the server 11 implements an information retrieval system 5 that utilizes the search system 100 of the present invention.

Each of the remote devices 15 and 17-20 has applications and can have a local database 16. Server 11 contains applications, and is connected to a database 12 that can be accessed by remote device 15 and 17-20 via connections 14(A-F), respectively, over a network 13. The server 11 executes software for a computer network and controls access to itself and database 12. The remote device 15 and 17-20 may access the database 12 over the network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices and the like. Included with each remote device 15 and 17-20 is an ability to request relevant material from a large collection of documents via search queries to the server 11. Thus, when a user at one of the remote devices 15 and 17-20 desires to access said search process of the search system 100 from the database 12 at the server 11, the remote device 15 and 17-20 communicates over the network 13, to access the search system 100, the server 11 and database 12.

Third party computer systems 21 and databases 22 can be accessed by the server 11 in order to provide access to additional collections of documents and/or search indexes. Data that are obtained from third party computer systems 21 and database 22 can be stored on server 11 and database 12 in order to provide later access to the user on remote devices 15 and 17-20. It is also contemplated that for certain types of data that the remote devices 15 and 17-20 can access, the third party computer systems 21 and database 22 directly use the network 13.

Figure 2:
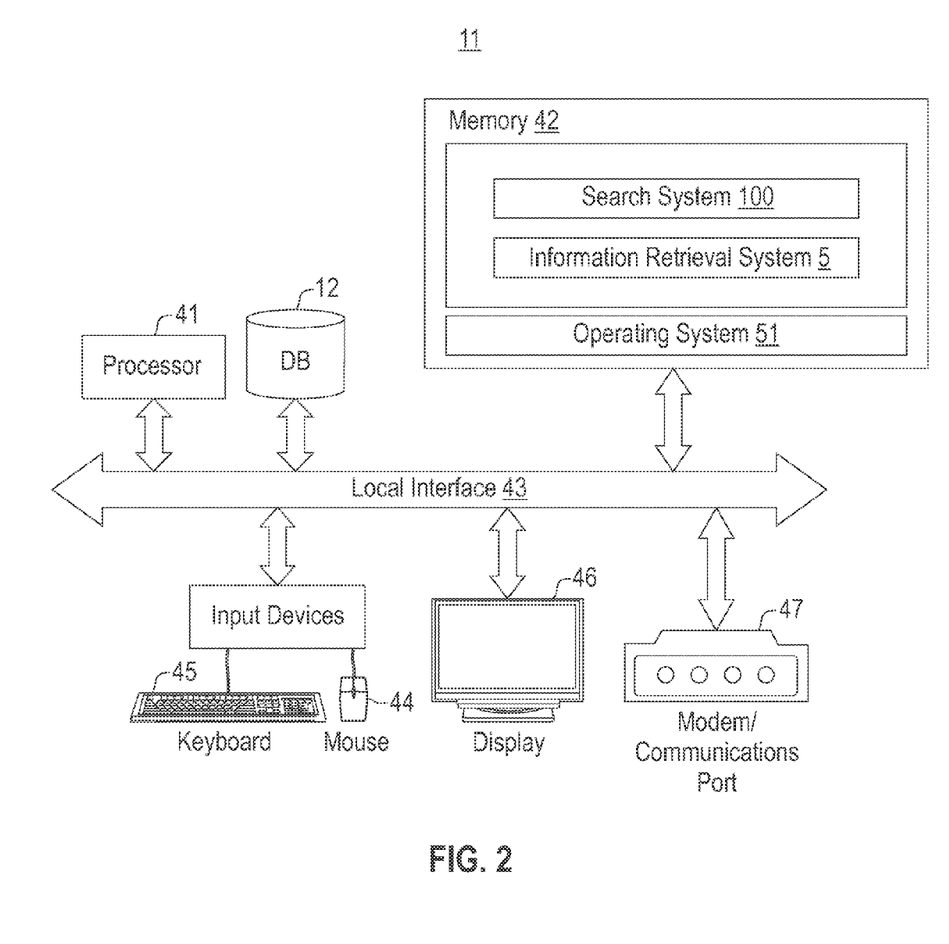
FIG. 2 is a block diagram illustrating an example of a server including a search system utilizing a search process for proximity searching for search queries, according to an embodiment of the present invention, as shown in FIG. 1.

The search system 100 utilizes said search process for fast and scalable proximal search for a very long search, according to an embodiment of the invention. Illustrated in FIG. 2 is a block diagram demonstrating an example of server 11, as shown in FIG. 1, utilizing the search system 100 according to an embodiment of the present invention. The server 11 includes, but is not limited to, PCs, workstations, laptops, PDAs, palm devices and the like. The processing components of the third party computer systems are similar to that of the description for the server 11 (FIG. 2).

Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but is not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remotely from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the search system 100 of the present invention. The system 100 comprises functional components and process blocks described further below.

The operating system 51 essentially controls the execution of other computer programs, such as the system 100, and provides scheduling, input/output control, file and data management, memory management, and communication control and related services. However, the system 100 of the present invention is applicable on all other commercially available operating systems.

The system 100 may comprise a source program, executable program (object code), script, or any other entity comprising a set of computer program instructions to be performed. When the system 100 is a source program, then the program is usually translated via a compiler, assembler, interpreter, or the like, which may or may not be included within the memory 42, so as to operate properly in connection with the O/S 51. Furthermore, the system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

When the system 100 is implemented in software, as is shown in FIG. 2, it should be noted that the system 100 can be embodied in any computer-readable medium for use by, or in connection with, an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote device 15 and 17-20 are similar to the description of the components for server 11 described with regard to FIG. 2. The remote devices 15 and 17-20 are referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Embodiments of the invention provide a time efficient process for conducting proximity searching for very long queries. Instead of indexing complete documents, each document is first split into smaller snippets and then each snippet is indexed as if it were a separate document. Searching query terms over snippets instead of complete documents introduces term proximity information implicitly in the search process, and no additional computations are required to compute distances between terms in a document. A paragraph long query is split into its constituent sentences, each sentence is treated as a separate query, and then the results of all the sentence queries are combined to construct the final search result set for the paragraph long query. In one example, a query may contain more than 100 words, or more than 500 words, or even more than 1,000 words. In one example, a query may contain more than 10 sentences, or more than 50 sentences, or even more than 100 sentences. In one example, a query can contain up to 10,000 words, and a query can contain up to 1,000 sentences.

Figure 3:
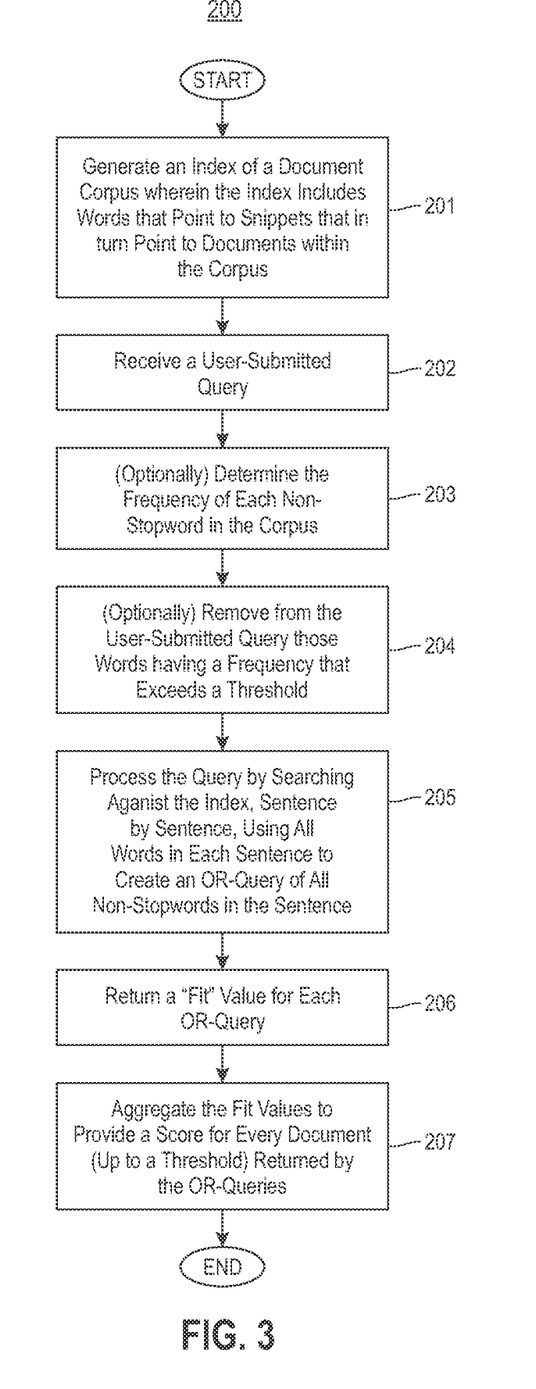
FIG. 3 shows a flowchart illustrating a process for proximity searching for search queries, according to an embodiment of the present invention.

FIG. 3 shows a flowchart of a search process 200 for fast and scalable proximal search for very long search queries (e.g., sentences), according to an embodiment of the invention. The scalable proximal search comprises implicit proximity searching operations described herein, according embodiments of the invention.

Process block 201 comprises generating an index of a document corpus wherein the index includes words that point to snippets that in turn point to documents within the corpus. In one embodiment, a corpus is defined to be any arbitrary collection of documents which are to be searched to find relevant material related to some search input.

Process block 202 comprises receiving a user-submitted query. In one example, the query comprises natural text input of at least one sentence, such as a product description or a research abstract text.

Process block 203 comprises (optionally) determining the frequency of each non-stopword in the corpus.

Process block 204 comprises (optionally) removing from the user-submitted query those words having a frequency that exceeds a user-supplied threshold.

Process block 205 comprises processing the query by searching against the index, sentence by sentence, using all words in each sentence to create an OR-Query of all non-stopwords in the sentence. Simple searching on a snippet-based index implicitly takes into account the distance between query terms in the documents (i.e., implicit proximity searching).

Process block 206 comprises returning a "fit" value for each OR-Query. In one embodiment, a fit value is defined to be a similarity metric that measures the amount of word content overlap that exists between two text units (e.g., documents). In one example, the similarity is based on measuring similarity between the snippet in the corpus and the original input text of the query.

Process block 207 comprises aggregating (i.e., merging) the fit values to provide a score for every document (up to a user-supplied threshold) returned by the OR-Queries. In one embodiment, the resulting snippets from OR-Query searching are scored (a higher score indicates a snippet contains multiple query terms), wherein snippets that contain many query terms are favored over snippets that contain only a few query terms. The snippet-based results are converted into document results, wherein for each document the rank scores of all the snippets are summed, and the resulting score is assigned to the document. Thus, documents having multiple matching snippets for a given input query are assigned a higher score.

As noted, embodiments of the invention provide implicit proximity searching operations. Proximity searching in document retrieval ensures that documents containing query terms in close proximity to each other are assigned a higher score. This becomes more important for longer documents. Typically, proximity searching utilizes the position information of various terms in the document to assign higher scores to documents that contain query terms in close proximity to each other. The position (or distance) information for document terms can be pre-computed at index time and distances between query terms present in the document can be computed at run time. According to an embodiment of the invention, a search process for longer queries does not require said position computations. The search process provides implicit proximity searching operations by decomposing the documents in a corpus into smaller units (e.g., snippets). In one example, a snippet includes three consecutive sentences from the original document. In one implementation, the following process in Table 1 can be used to generate snippets given a document.

TABLE 1

Snippet Generation Process

Figure 4:
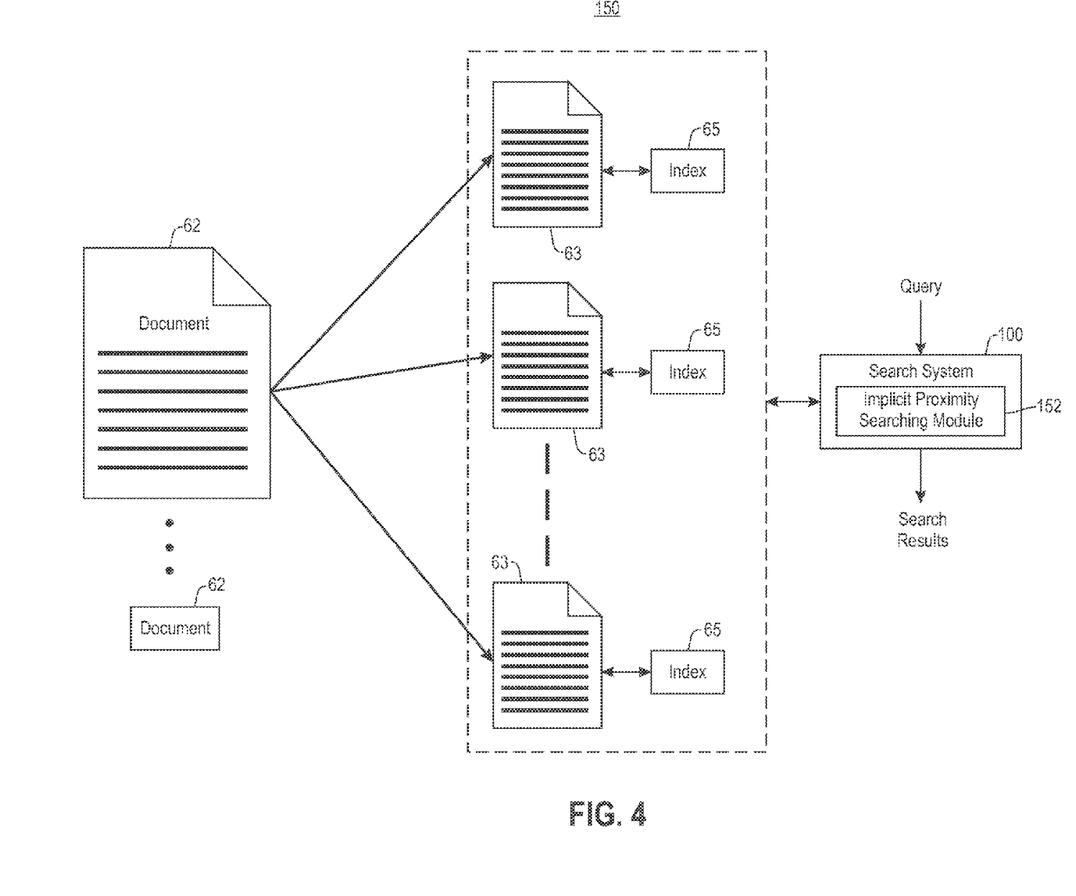
FIG. 4 shows a process for snippet generation and indexing for proximity searching, according to an embodiment of the invention.

Input = an array of all the sentences in the document, sentences.
    1. documentLength =sizeOf(sentences)
    2. for(i=1; i <=documentLength–2; i++)
    3.   snippet = sentence numbers i,i+1 and i+2
    4.   Print snippet to a file
    5. End FIG. 4 shows an embodiment of a process 150 that utilizes the above snippet generation process for generating snippets from a document, according to an embodiment of the invention. Each original document 62 is decomposed into a number of snippets 63 that are much shorter in length than the original document. Each snippet 63 is treated as a separate document and a word index 65 is generated for each snippet 63. A scalable proximal search is performed by a implicit proximity searching module 152 which implements implicit proximity searching operations described herein, according embodiments of the invention.

Figure 5:
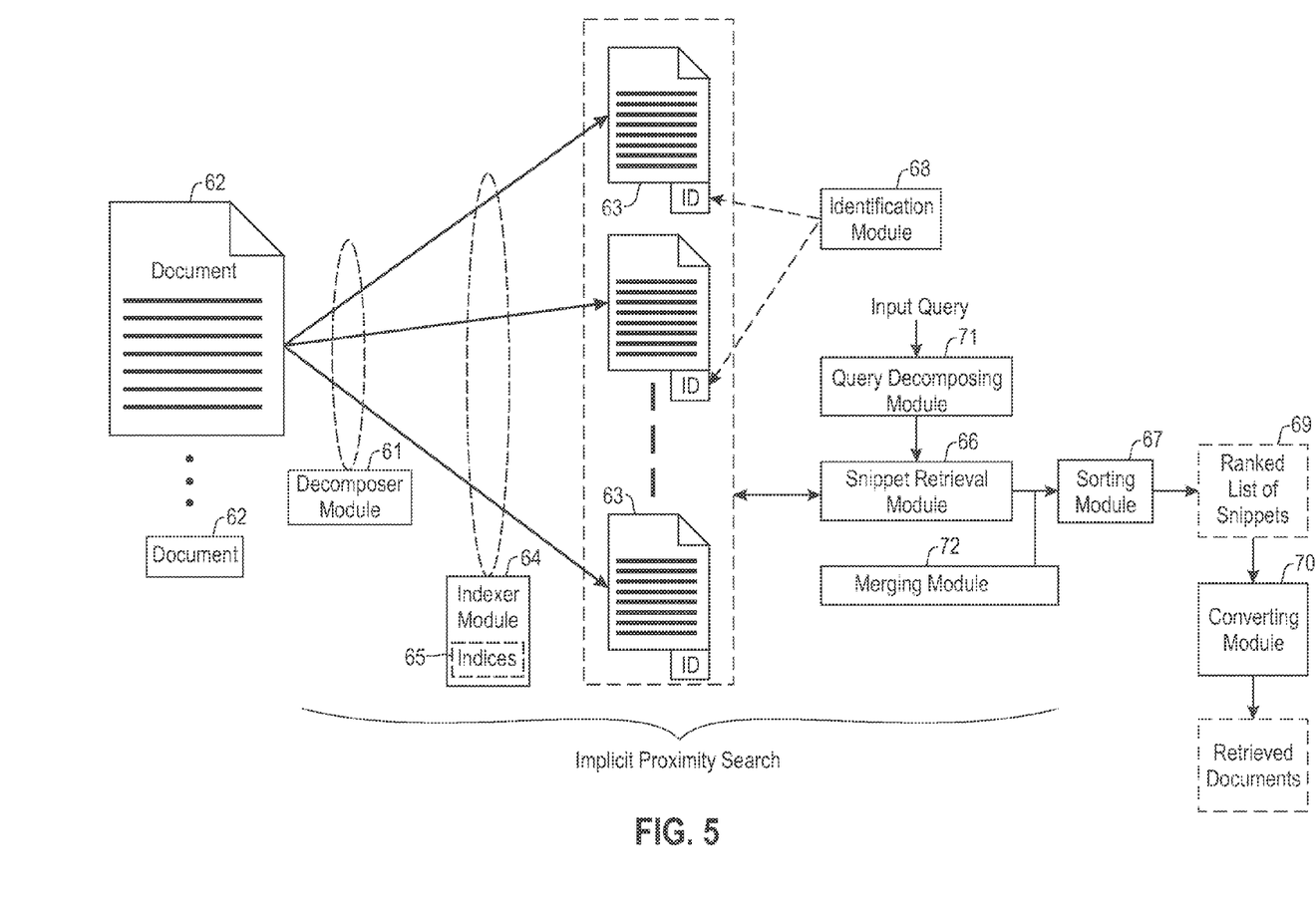
FIG. 5 shows an architecture and operation of a search system for proximity searching for search queries, according to an embodiment of the invention.

FIG. 5 shows an embodiment of an architecture for the search system 100 in conjunction with the above snippet generation process, according to an embodiment of the invention. A decomposer module 61 of the search system 100 decomposes a given document 62 that is decomposed into a number of snippets 63 that are much shorter in length. Each snippet 63 is treated as a separate document and is word indexed by an indexer module 64 of the search system 100.

An identifier (ID) is assigned to each snippet 63 by an identification module 68 of the search system 100, whereby all the snippets generated from the document 62 can be identified. Decomposing the document 62 into snippets 63 and indexing these individual snippets 63 as indices 65, introduces an implicit proximity search operator, according to an embodiment of the invention.

In response to a user input query, a snippet retrieval module 66 of the search system 100 finds snippets containing one or more query terms. These snippets are then ranked using a sorting module 67 that assigns higher scores to snippets that contain multiple query terms. Thus, snippets that contain many query terms are favored over snippets that contain only a few query terms.

Because each snippet 63 comprises a small continuous segment of the text of the original document 62, a snippet containing multiple query terms implies that query terms are present in close proximity to each other in the original document 62 from which the snippet 63 was generated. Thus, according to an embodiment of the invention, term proximity information is obtained without computing the distances between query terms present in the document 62 at query time.

The number of sentences in a snippet 63 can be varied depending upon the application. Longer snippets will result in a smaller number of overall documents to index but result in a weaker proximity search operator, whereas shorter snippets favor strong proximity search operators at the expense of large number of documents in the index.

The above steps produce a ranked list of snippets 69 as output. According to an embodiment of the invention, the search system 100 converts such snippet-based results into document results (e.g., users are interested in obtaining relevant "full documents" rather than snippets). Hence, in order to generate a ranked list of documents, for a document 62 the rank scores of all the snippets in the ranked list of snippets 69 for the document are summed by a converting module 70, and the resulting score is assigned to the document 62. Thus, documents having multiple matching snippets for a given input query are assigned a higher score. The snippet ranking scores can be merged into document scores in different ways depending upon the requirements of the application.

According to an embodiment of the invention, the search system 100 accounts for long queries wherein in one example a long query comprises 10 words or more. A query decomposing module 71 of the search system 100 decomposes a long query into smaller sub-queries. For example, if the input query is a paragraph of text (i.e., paragraph query), the paragraph is decomposed into its constituent sentences and each sentence (i.e., sub-query) is used as a query into the snippet retrieval module 66. A merger module 72 merges (aggregates) the snippet results of all the sub-queries together to create a final ranked list for the paragraph query. The whole procedure is summarized below.

In one implementation, the merger module 72 creates a similarity query based on each sentence of the input paragraph (stop-words may be removed from the sentence to retain important keywords only). The merger module 72 then uses the top n (e.g., 500) snippets based on simple word similarity (e.g., the more unique words in the original input that a snippet contains, the higher the score of the snippet). The merger module 72 removes duplicate snippets for each document, keeping only the one with the best score, and transforms the snippet results into document results for each sentence sub-query as described above. The merger module 72 then sums the scores for each document for each sentence and sorts the documents by the final scores. The top m documents can then be provided to the user in decreasing order of their scores.

According to an embodiment of the invention, the search response time for a query can further be reduced using corpus specific stop-words. In one example, the corpus comprises documents that are all concerning a specific technical area. The number of snippets that are generated for a given document are S-1, where S is the number of sentences in the document and 1 is the number of sentences in a snippet. Thus, if there are D documents in the corpus, the total number of effective documents that are in the search system index will now be D(S-1) which corresponds to results in very long posting lists.

As there may be a large number of very long posting lists to merge together, in order to reduce the number of posting lists, corpus specific stop words are created that include some of the most frequent words present in the corpus. Since the queries expected by the system are not simple terms such as "face recognition" but a paragraph containing many keywords, the effect of removing a few highly frequent keywords on the overall score of a document is small. This is because for a long query where the OR operator is used in the query terms (which is generally the case as the AND operator is too restrictive), the only documents searching will miss will be the ones that only have those particular keywords.

Such documents, however, will automatically be ranked much lower than the other documents because they only have those particular keywords as compared to the documents that have multiple or less frequent keywords as well. For a single query, the documents are assigned multiple scores, each corresponding to a sentence in the paragraph query. As such, if a document is highly relevant, it is expected that it should have a high score for most of the sentences in the paragraph. Thus, a few missing frequent keywords from one or two sentences should not have a large effect on the overall score of a document.

The use of frequent terms as stop-words reduces the number of posting lists that need to be merged together to create the final result set for a given sub-query. Because the posting lists in a snippet based index are very long (even after stop-word removal), creating the final ranked list can take time. This is because even after stop-word removal, there can be several terms (e.g., 6 to 8 terms) in a sentence query. Since the final result set is constructed using an OR operation, the total number of snippets that the ranking function needs to rank may be very large (e.g., equal to the number of snippets that contain at least one query term).

An end-user generally may not want to examine many documents but only a few select important documents. The importance of a document depends on how many important query terms are present in the document. According to an embodiment of the invention, the rarest term in a given sub-query is the most important term because it has the maximum discriminating power among all the query terms. As such, an embodiment of the invention ensures that all the documents presented to the user contain this important term. Further, when selecting the rarest terms, the frequency of the selected rarest term is higher than a given threshold m (e.g., 500). This is to ensure that in case of very rare/noise terms, there is a sufficient number of results.

As such, the rarest term is the one with highest IDF (or least document frequency), provided the document frequency is above a pre-defined threshold. Therefore, when the search system receives a sentence sub-query, a term $T_{min}$ with the least document frequency above the set threshold m is selected. The posting lists of remaining terms in the query are merged together using an OR operation and the resulting set is combined with the posting list of $T_{min}$. As a result, the number of documents/snippets that the ranking function has to rank are not larger than the size of the posting list $T_{min}$. This selective operation can be represented mathematically as:

$$P_{T_{min}} \cap (\cup_{T \in S/T_{min}} P_r)$$

where S is the set of query terms in the sentence and $P_X$ represents the posting list of term x in S.

In an example application, using a conventional approach approximately 215,000 documents were indexed using a search toolkit. For queries, abstracts of 5 different documents were selected as queries for retrieval operations (i.e., retrieving documents in response to the selected queries). Using a default search option provided by a conventional search engine, the average query response time for these five queries was about 16770.24 milliseconds.

According to an example application of an implementation of the search process of the present invention, snippets were generated for all said 215,000 documents using a window size of 3 sentences, resulting in approximately 53 million snippets. The snippets were then indexed using said search toolkit. The above retrieval operation for the same five queries was again performed using the implicit proximity search operation disclosed herein. The average query response time was observed to be about 2422.72 milliseconds, providing a performance improvement over the conventional approach. According to embodiments of the invention, further improvements in query response time performance can be gained by utilizing an inherent potential for parallelism in the search process disclosed herein. For example, instead of retrieving snippets for all constituent sentences in the query sequentially, the snippets for each sentence can be retrieved in parallel and then combined to achieve further performance gains.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer program product for information retrieval from multiple documents, the computer program product comprising a tangible storage medium readable by a computer system and storing instructions for execution by the computer system for performing a method comprising:
   splitting each document into multiple snippets of words;
   indexing each snippet as a separate document;
   receiving an input search query including at least one sentence;
   processing the search query against the indexes of each of the multiple snippets by searching query terms over each of the multiple snippets to implicitly introduce term proximity information in the information retrieval;
   decomposing the search query into sub-queries;
   processing each sub-query against the indexes of each of the multiple snippets, sentence by sentence, using all words in each sentence of the sub-query to create an OR-Query of all non-stopwords in the sentence;
   returning a fit value for each OR-Query; and
   aggregating the fit values to provide a score for every document returned by the OR-Queries.

2. The computer program product of claim 1, wherein a snippet comprises multiple consecutive sentences of an original document.

3. The computer program product of claim 2, wherein processing the search query comprises:

processing the search query against the indexes of each of the multiple snippets, sentence by sentence, using all words in each sentence to create an OR-Query of all non-stopwords in the sentence.

4. The computer program product of claim 3, wherein processing the search query comprises:

returning a fit value for each OR-Query, wherein a fit value represents a similarity metric that measures the amount of word content overlap between two text units; and aggregating the fit values to provide a score for every document returned by the OR-Queries.

5. The computer program product of claim 4, wherein the similarity is based on measuring similarity between a snippet in the documents and the original input text of the query.

6. The computer program product of claim 1, wherein the method comprises:

determining the frequency of each non-stopword in the documents; and removing from the search those words having a frequency that exceeds a threshold.

7. The computer program product of claim 1, wherein the method comprises:

processing each sub-query against the indexes of each of the multiple snippets for searching sub-query terms over the multiple snippets, implicitly introducing term proximity information in the information retrieval.

8. An information retrieval system, comprising:

an indexer configured for splitting each document into multiple snippets of words and indexing each snippet as a separate document; and a searching module configured for receiving an input search query and searching the query against the indexes of each of the multiple snippets by searching query terms over each of the multiple snippets to implicitly introduce term proximity information in the information retrieval;

wherein the searching module is further configured to:

search the query against the indexes of each of the multiple snippets, sentence by sentence, using all words in each sentence to create an OR-Query of all non-stopwords in the sentence, and return a fit value for each OR-Query, wherein a fit value represents a similarity metric that measures the amount of word content overlap between two text units; and the system further comprises an aggregator configured to aggregate the fit values to provide a score for every document returned by the OR-Queries, and a query module configured to decompose the search query into sub-queries.

9. The system of claim 8, comprising:

a document decomposing module configured for splitting each document into the multiple snippets of words;

wherein a snippet comprises multiple consecutive sentences of an original document.

10. The system of claim 9, wherein:

the searching module processes each sub-query against the indexes of each of the multiple snippets for searching sub-query terms over the multiple snippets, implicitly introducing term proximity information in the information retrieval.

* * * * *